V. ZDZIARSKI.
RUNNING GEAR MECHANISM AND BRAKE APPARATUS FOR TRAMWAY CARS.
APPLICATION FILED JAN. 14, 1909.
926,534.
Patented June 29, 1909.
2 SHEETS—SHEET 1.
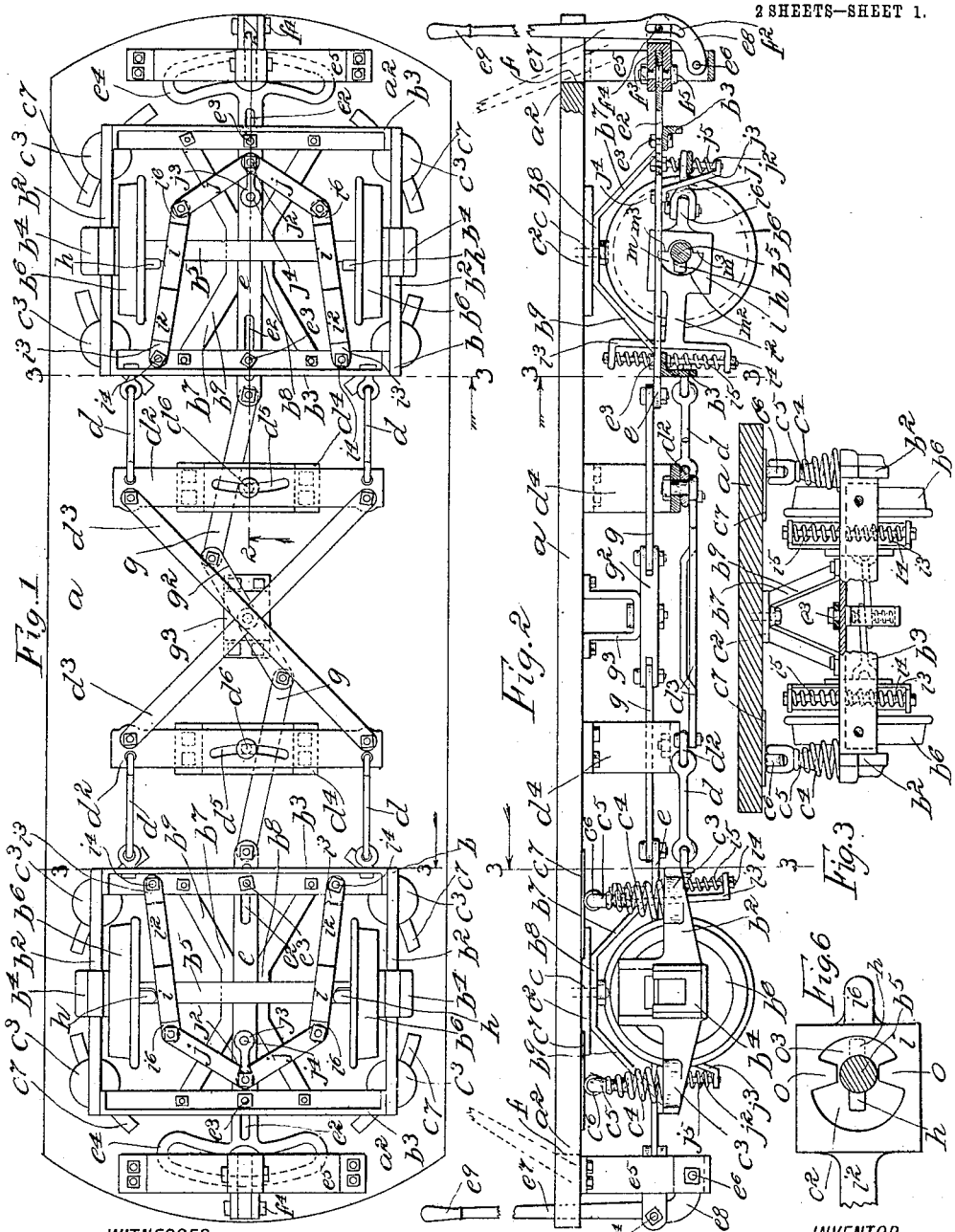
WITNESSES
INVENTOR
VICTOR ZDZIARSKI
BY
ATTORNEYS.

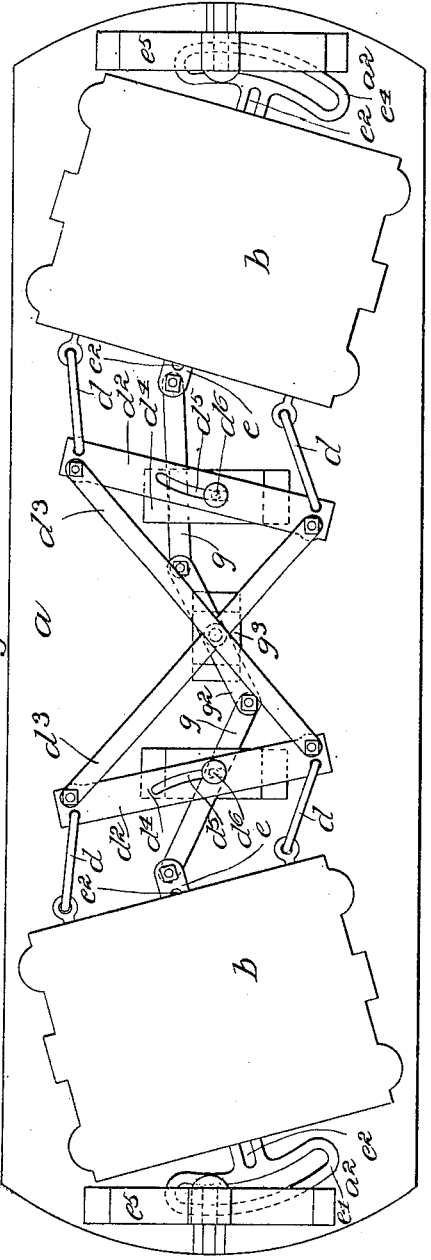

UNITED STATES PATENT OFFICE.

VICTOR ZDZIARSKI, OF NEW YORK, N. Y.

RUNNING-GEAR MECHANISM AND BRAKE APPARATUS FOR TRAMWAY-CARS.

No. 926,534.  Specification of Letters Patent.  Patented June 29, 1909.

Application filed January 14, 1909. Serial No. 472,184.

*To all whom it may concern:*

Be it known that I, VICTOR ZDZIARSKI, a subject of the Czar of Russia, and residing at New York, in the county of New York and State of New York, have invented certain new and useful Improvements in Running-Gear Mechanism and Brake Apparatus for Tramway-Cars, of which the following is a specification, such as will enable those skilled in the art to which it appertains to make and use the same.

This invention relates to tramway cars; and the object thereof is to provide an improved running gear mechanism and brake apparatus for cars of this class, the construction being such that the brake apparatus may be operated from either end of the car and the car conveniently and easily turned on curved tracks without interfering with the operation of the brake apparatus, and with this and other objects in view the invention consists of the construction, combination and arrangement of parts hereinafter described and claimed.

The invention is fully disclosed in the following specification, of which the accompanying drawings form a part, in which the separate parts of my improvement are designated by suitable reference characters in each of the views, and in which:—

Figure 1 is a bottom plan view of the bed-work or frame of a car body and showing my improved running gear mechanism and brake apparatus, all the super-structure of the car being omitted, Fig. 2 a side view thereof partly in section on line 2—2 of Fig. 1, Fig. 3 a section on either of the lines 3—3 of Fig. 1, or on either of the lines 3—3 of Fig. 2 and with parts broken away, Fig. 4 a view similar to Fig. 1, but showing the position of the running gear including the truck frames when the car is turning a curve, the truck frame, wheels, axles and parts connected therewith being shown diagrammatic only, Fig. 5 a view similar to Fig. 1, but showing the brake apparatus in operation and showing only a part of the construction, and;—Fig. 6 a side view of a modified form of brake head or block which I employ.

In the drawings forming part of this specification, I have shown at $a$ the bed-work, frame or bottom of a car, the ends $a^2$ of which form the platforms of the car, and in the practice of my invention, I provide, in the form of construction shown, two truck frames $b$, said truck frames being rectangular in form and composed of parallel side members $b^2$ and parallel outer and inner members $b^3$, and the parallel outer and inner members $b^3$ are preferably composed of angle iron.

The side members $b^3$ of the truck frames $b$ carry and form part of the journal boxes $b^4$ in which the ends of the axles $b^5$ are mounted in the usual manner, and said axles are provided with the usual wheels $b^6$.

The bed-work frame or bottom $a$ of the car is supported on the truck frames $b$ by spider-work devices $b^7$ comprising central portions $b^8$ and legs or arms $b^9$ connected with the parallel inner and outer members $b^3$ of the truck frames, and the connection of the central portions $b^8$ of the spider-work devices $b^7$ with the bottom or bed-work $a$ of the car are pivotal connections made by means of king pins $c$ which pass through wear plates $c^2$ secured to the bottom $a$ of the car, or this connection may be made in the usual or any desired manner.

The truck frames $b$ are provided at their corners with cup-shaped receivers $c^3$ in which are placed conical spiral springs $c^4$ in the tops of which are placed or secured pins or plugs $c^5$ provided with roller heads $c^6$ which bear on plates $c^7$ secured to the bottom $a$ of the car or truck frame, and loosely connected with the inner sides $b^3$ of the truck frames $b$ by means of links $d$ are cross bars $d^2$ with which are pivotally connected diagonally arranged and interacting link bars $d^3$.

This construction, as will be seen, constitutes the running gear of the car, and by means thereof the truck frames $b$, the axles $b^5$ mounted therein and the wheels $b^6$ are free to follow the rails of the track and to turn on curves thereof as indicated in Fig. 4, and this construction also renders unnecessary the use of four wheel trucks, or what are known as two wheel trucks with trailers as the following truck is always compelled to turn in a direction opposite to that of the preceding truck as indicated in Fig. 4 and to follow said preceding truck on a curve, this operation resulting from the intermediate connection of said trucks comprising the parts $d$, $d^2$ and $d^3$.

Between the truck frames $b$ and suspended from the bottom bed-work or frame of the car are parallel yoke-shaped hangers $d^4$ which are directly over the cross bars $d^2$ when the latter are in their normal or parallel position as shown in Fig. 1, and said cross bars are provided with segmental slots $d^5$ through which are passed pins or bolts $d^6$ secured in the yoke-shaped hangers $d^4$.

The construction hereinbefore described covers the running gear independent of the brake mechanism which will now be described. Mounted transversely of and over the truck frames $b$ are draw bars $e$ provided in their opposite end portions with longitudinal slots $e^2$ through which are passed pins or bolts $e^3$ secured in the inner and outer parallel members $b^3$ of the truck frames $b$, and the draw bars $e$ are also provided at their outer ends with transverse and segmentally curved link-shaped heads $e^4$.

Below the opposite end platforms $a^2$ of the bottom $a$ of the car are yoke-shaped hangers $e^5$ in the bottom portions of which are pivoted as shown at $e^6$ levers $e^7$ having segmentally curved portions $e^8$ at their lower ends and handle portions $e^9$ which pass up through slots $f$ in the platforms $a^2$, and the curved portions $e^8$ of the levers $e^7$ are provided with segmental slots $f^2$.

Connected with the heads $e^4$ of the draw bars $e$ are yoke-shaped devices $f^3$, this connection being made by means of pins or bolts $f^5$ passed through the slots in the heads $e^4$ of said braw bars, and the yoke-shaped devices $f^3$ are provided with slots in their outer ends and through which the levers $e^7$ pass, and pins $f^4$ are passed through said yoke-shaped devices and through the slots $f^2$ in the levers $e^7$.

Connected with the inner ends of the draw bars $e$ are link devices $g$ which are connected with a central supplemental link device $g^2$ which is pivoted to a central yoke-shaped hanger $g^3$ secured to the bottom end of the car.

The axles $b^5$ are each provided on the inner sides of the wheels $b^6$ with longitudinal lugs or short ribs $h$, and loosely mounted on said axles are two lock or brake heads and blocks $i$ having backwardly directed arms $i^2$ provided at their rear ends with vertically arranged yokes $i^3$ in which are placed bolts $i^4$ which pass downwardly through the inner portions $b^3$ of the truck frames $b$ and on which and above and below said inner portions of the truck frames are placed springs $i^5$.

The lock or brake heads $i$ are also provided with outwardly directed members or projections $i^6$ with which are connected links $j$, said links being pivotally connected by bolts $j^2$ which are secured in the draw bars $e$ rearwardly of the outer parts of the truck frames $b$, and the lower ends of said bolts are supported by braces $j^3$ secured to the draw bars $e$ at $j^4$, and the bolts $j^2$ are provided above and below the links $j$ with springs $j^5$.

The lock or brake heads $i$ are provided with openings $m$ through which the axles $b^5$ pass, and these openings are enlarged and semi circular in form at one side as shown at $m^2$, and this forms shoulders $m^3$ above and below the axles, and when the lock or brake heads $i$ are moved outwardly in the operation of the brake apparatus the lugs or short ribs $h$ on the axles pass through the openings $m$ and as the axles turn said lugs or ribs come in connection with the shoulders $m^3$ and the rotation of the axles and wheels is stopped as will be readily understood. This operation will, of course, cause a sudden jerk or jar, and the shock thereof is taken up by the springs $i^5$ and $j^5$ which permit of a slight vertical movement or rotation of the lock or brake heads $i$.

In Fig. 1, the parts are all shown in their normal position with the brake apparatus out of operation, but in Fig. 5 the brake apparatus is indicated in operation. In order to throw the brake apparatus into operation the lever $e^7$ at either end of the car may be operated, and in this operation said lever is forced inwardly as indicated in dotted lines. This forces the lock or brake heads $i$ as indicated in Fig. 5 and the wheels and axles are locked, and in order to release the said wheels or axles the lever is moved back into its normal position as indicated in Fig. 2.

Only a part of the brake apparatus is shown in Fig. 5, but enough is shown to indicate the operation thereof and the position which the main parts thereof assume when in operation; and in Fig. 4 the truck frames $b$, the axles and all the interior parts of said truck frames are indicated diagrammatically only, the showing of the details in this figure being deemed unnecessary.

In Fig. 6, I have shown a modification of the brake heads or blocks $i$ in which the central opening through which the axles $b^5$ pass is circular in form and provided at approximately opposite sides with inwardly directed lugs or projections $o$ forming two openings $o^2$ and $o^3$ through which the lugs or ribs $h$ on the axles $b^5$ may pass, and with this construction the said lugs or ribs $h$ operate in connection with and on either side of the lugs or projections $o$ as will be readily understood.

From the description, it will be seen, that the operation of the brake apparatus is independent of the particular form of running gear shown and described except that portion of the running gear consisting of the truck frames $b$ and those parts of the brake apparatus that are connected therewith; and various changes in and modifications of the running gear and other parts of the mechanism herein shown and described may be made, within the scope of the appended claims, without departing from the spirit of my invention or sacrificing its advantages.

Having fully described my invention, what I claim as new and desire to secure by Letters Patent, is:—

1. In an apparatus of the class described, a running gear for cars comprising a bed or bottom, truck frames rotatably mounted thereunder and provided with axles arranged transversely of the bed or bottom and provided with wheels, draw bars mounted transversely of said truck frames and of said axles, a central link member pivoted centrally beneath the bottom or bed, other link members connected with said draw bars and with said central link member, lock or brake heads mounted on said axles and movable longitudinally thereof and pivotally connected with the transverse members of the truck frames at one side, the other sides of said lock or brake heads being provided with pivoted link members which are pivotally connected with said draw bars, and means for operating said draw bars whereby said lock or brake heads are forced inwardly or outwardly.

2. In an apparatus of the class described, a running gear for cars comprising a bed or bottom, truck frames rotatably mounted thereunder and provided with axles arranged transversely of the bed or bottom and provided with wheels, draw bars mounted transversely of said truck frames and of said axles, a central link member pivoted centrally beneath the bottom or bed, other link members connected with said draw bars and with said central link member, lock or brake heads mounted on said axles and movable longitudinally thereof and pivotally connected with the transverse members of the truck frames at one side, the other sides of said lock or brake heads being provided with pivoted link members which are pivotally connected with said draw bars, and means for operating said draw bars whereby said lock or brake heads are forced inwardly or outwardly, said draw bars being adapted to be operated from either end of the car.

3. A running gear for cars comprising a bed or bottom main frame, truck frames rotatably mounted under the opposite end portions thereof and provided with axles having wheels, hangers supported transversely of the bed or bottom main frame between said truck frames, bars pivotally suspended in said hangers and movable transversely of the main frame and adapted to swing in a horizontal plane, link members connecting said truck frames with said bars and diagonally arranged link bars which cross each other in opposite directions and are connected with the opposite end portions of the first named bars.

4. A running gear for cars comprising a bed or bottom main frame, truck frames rotatably mounted under the opposite end portions thereof and provided with axles having wheels, hangers supported transversely of the bed or bottom main frame between said truck frames, bars pivotally suspended in said hangers and movable transversely of the main frame and adapted to swing in a horizontal plane, link members connecting said truck frames with said bars and diagonally arranged link bars which cross each other in opposite directions and are connected with the opposite end portions of the first named bars, the axles of the truck frames being also provided with brake devices which are mounted thereon and movable toward and from the wheels, and means for operating the brake devices on both axles from either end of the car.

5. A running gear for cars comprising a bed or bottom main frame, truck frames rotatably mounted under the opposite end portions thereof and provided with axles having wheels, hangers supported transversely of the bed or bottom main frame between said truck frames, bars pivotally suspended in said hangers and movable transversely of the main frame and adapted to swing in a horizontal plane, link members connecting said truck frames with said bars and diagonally arranged link bars which cross each other in opposite directions and are connected with the opposite end portions of the first named bars, the axles of the truck frames being also provided with brake devices which are mounted thereon and movable toward and from the wheels, and means for operating the brake devices on both axles from either end of the car, said brake devices being also capable of a slight rotary action on said axle, and tension devices for limiting such rotation.

6. In an apparatus of the class described, a main bed or frame, truck frames rotatably mounted beneath the opposite end portions thereof and the corners of which are provided with cup-shaped receivers, spiral springs placed in said receivers, and pins or plugs placed in the top end portions of said springs and provided with rollers adapted to bear on the bottom of the main bed or frame or plates secured thereto.

In testimony that I claim the foregoing as my invention I have signed my name in presence of the subscribing witnesses this thirteenth day of January 1909.

VICTOR ZDZIARSKI.

Witnesses:
C. E. MULREANY,
HARRY R. CANFIELD.